United States Patent
Näumann et al.

(10) Patent No.: US 6,302,246 B1
(45) Date of Patent: Oct. 16, 2001

(54) BRAKE UNIT

(75) Inventors: Emil Näumann, Ebersbach; Kolja Rebstock, Ulm; Hans-Georg Riedel, Pforzheim; Karl-Heinz Röss, Ebersbach; Stephan Wolfsried, Waiblingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/471,677

(22) Filed: Dec. 23, 1999

(30) Foreign Application Priority Data

Dec. 23, 1998 (DE) .............................. 198 59 840

(51) Int. Cl.⁷ .................................................. F16D 65/12
(52) U.S. Cl. ................... 188/218 XL; 188/18 A
(58) Field of Search .................... 188/18 A, 205 R, 188/206 R, 218 XL, 251 M; 192/107 M

(56) References Cited

U.S. PATENT DOCUMENTS

| | | | | |
|---|---|---|---|---|
| 5,325,941 | * | 7/1994 | Farinacci et al. | 188/218 XL |
| 5,339,931 | * | 8/1994 | Jacko et al. | 188/251 M |
| 5,620,791 | * | 4/1997 | Dwivedi et al. | 188/251 M |
| 6,116,386 | * | 9/2000 | Martin | 188/218 XL |
| 6,119,827 | * | 9/2000 | Militello et al. | 188/218 XL |

FOREIGN PATENT DOCUMENTS

| | | |
|---|---|---|
| 1 775 685 | 9/1971 | (DE) . |
| 37 21 718 | 1/1989 | (DE) . |
| 37 31 540 | 3/1989 | (DE) . |
| 42 23 417 | 1/1994 | (DE) . |
| 42 37 655 | 5/1994 | (DE) . |
| 43 22 113 | 12/1994 | (DE) . |
| 43 38 593 | 5/1995 | (DE) . |
| 196 23 425 | 12/1997 | (DE) . |
| 297 10 533 | 1/1998 | (DE) . |
| 197 06 925 | 8/1998 | (DE) . |
| 197 11 829 | 9/1998 | (DE) . |

OTHER PUBLICATIONS

M. Burckhardt, "Fahrwerktechnik: Bremsdynamik und PKW–Brensanlagen", Aug. 1, 1991, pp. 239–298.**–English Summary provided.

A. Mühlratzer, "Faserverbundkeramik—in: MAN–Forschen–Planen–Bauen", Aug. 12, 1993, pp. 48–55.**–English Summary provided.

D. Schramm, "Reibelemente für die Industrie in: Antriebstechnik", 21, No. 12, pp. 620–625.**–English Summary provided.

* cited by examiner

Primary Examiner—Christopher P. Schwartz
(74) Attorney, Agent, or Firm—Kenyon & Kenyon

(57) ABSTRACT

A brake unit comprising at least one brake and at least one brake pad having at least one friction lining is described. The brake has a disk brake with a brake rotor made of a ceramic-metal composite (CMC) whose outer surface or surfaces at least partially form a friction surface for the at least one friction lining, and a disk brake cup that is mounted on the disk brake by way of one or more mounting elements. The friction surface of the disk brake has a hardness of approximately 1600 to 2500 HV, and the at least one friction lining has a coefficient of friction of approximately 0.3 to 0.5. The disk brake cup and/or the mounting elements form a corrosion-inhibiting attachment to the disk brake. The brake unit can be operated in corrosion-free fashion over a service life of at least approximately eight to 10 years or approximately 200,000 to 300,000 km.

23 Claims, 1 Drawing Sheet

BRAKE UNIT

The present invention relates to a brake unit comprising at least one disk brake and at least one brake pad having at least one friction lining. More specifically, the brake unit includes a brake rotor made of a ceramic-metal composite (CMC) whose outer surface or surfaces at least partially form a friction surface for the at least one friction lining, and a disk brake cup that is mounted on the disk brake by way of one or more mounting elements.

SUMMARY OF RELATED ART

In high-performance brake units used both for motor vehicles and for rail vehicles, outstanding braking properties, excellent braking smoothness, and at the same time the longest possible service life are required. Conventional brake units having cast-iron disk brakes, however, have comparatively unfavorable wear rates in braking operation. In high-performance brake units, in addition to brake related wear, so-called "stroking wear," is particularly significant. This type of wear creates geometrical defects on the brake rotor and promotes rubbing phenomena, therefore degrading braking smoothness. The same effect results from thermal distortion of the brake rotor, which occurs when the brake rotor is heavily loaded and high temperatures thereby occur. Lastly, the cast-iron disks commonly used are not designed for extremely high brake loads, since in such a situation heat stress cracks occur on the friction surface and render the friction surface unusable. Until now these defects could be remedied only by costly replacement of the disk brakes in question.

Another frequent reason for costly replacement of disk brakes is corrosion damage to the brake rotors. So-called "idle spots," in particular, which can occur if the vehicle is not driven for some time, can cause rubbing vibrations that adversely affect braking smoothness and reduce braking performance.

With brake units having conventional cast-iron disk brakes, it is also possible for high-frequency sounds, in the range from approximately 1500 to 6500 Hz, to occur. Preventing this noise necessitates replacement of the disk brake.

With the development of disk brakes and disk brake friction surfaces made of ceramic-metal composites (CMC disk brakes), attempts were made to eliminate these disadvantages. German Patent 43 22 113, for example, discloses a brake rotor for disk brakes, in particular for use as a shaft or axle disk brake of rail vehicles, which has a metal support member equipped with a layer of microscopically or macroscopically organized regions of at least two different materials. One region is formed from a ceramic material, and the other region from a metallic, sintered metal, or sintered metal-ceramic material. Besides the complex methods of fabrication required for a multiple-part disk brake of this kind, the design does not solve the problem of the wear lifetime and braking smoothness of a brake unit, in particular for motor vehicles but also for rail vehicles applications.

German Patent Application 196 23 425 A1 discloses a reaction-bonded ceramic for ceramic composite materials that includes mullite as the principal constituent, and corundum and thortveitite or cerianite as secondary constituents used substantially as thermal protection material. This patent does not address the problem of the braking smoothness and service life of brake units.

German Patent Application 42 37 655 A1 discloses a brake rotor for the disk brake of a motor vehicle that has an inner and an outer friction ring between which cooling channels are arranged. The outer friction ring is made of a composite fiber material and the inner friction ring of a gray cast iron material. The two friction rings are immovably joined to one another. The material of the friction surfaces of the brake pads can correspondingly also be adapted to the material of the friction surfaces of the disk brake. Although this does result in improved frictional behavior and a reduction in friction vibrations of the disk brake, the manufacture of multiple-part disk brakes with different friction linings for the brake pads is very complex. No mention is made in this patent concerning the service life of the brake unit.

SUMMARY OF THE INVENTION

The present invention is a brake unit that offers great braking smoothness and a long service life, and can nonetheless be manufactured easily and economically.

In one aspect, the invention is a brake unit having at least one disk brake, that includes a brake rotor made of a ceramic-metal composite, having a friction surface with a hardness of between about 1600 and 2500 HV, at least one brake pad having a friction lining adapted to contact the friction surface of the brake rotor, the friction lining having a coefficient of friction of between about 0.3 and 0.5, and a disk brake cup mounted on the brake rotor by at least one mounting element, the disk brake cup being formed of a noncorroding material and the mounting elements being formed at least in part from a noncorroding material, thus forming a corrosion-inhibiting attachment of the disk brake.

The brake unit according to the invention has a friction surface of the disk brake with an hardness of approximately 1600 to 2500 HV. At least one friction lining has a coefficient of friction of approximately 0.3 to 0.5, and the disk brake cup and/or the mounting elements are configured such that a corrosion-inhibiting attachment to the disk brake exists, so that the brake unit can be operated in corrosion-free fashion over a service life of at least approximately eight to ten years, or approximately 200,000 to 300,000 km.

Friction surfaces made of ceramic-metal composite material for brake rotors, and brake rotors made of ceramic-metal composite material, in combination with friction linings having a coefficient of friction of approximately 0.3 to 0.5 and a corrosion-inhibiting attachment of the disk brake cup to the brake rotor, make it possible to significantly extend both braking smoothness and the service life of the brake unit, according to the present invention, as compared to conventional brake units. A wide variety of wear tests on test stands and vehicles have shown that service lives of approximately eight to ten years, or 200,000 to 300,000 km can be achieved without difficulty, because the wear rates for brake operation are lesser, by orders of magnitude, than with the presently widespread technology using cast iron disks.

The wear components resulting from "stroking wear" are reduced to such an extent that geometrical defect formation plays no further role. As a result, practically no further rubbing phenomena occur, so that braking smoothness is no longer disadvantageously influenced by the defects. In addition, thermal distortion of the brake rotor is no longer observed at temperatures up to 1200° C., and thermal stress cracks in the friction surface also no longer occur, so that premature disk brake replacement is no longer necessary.

Extensive corrosion tests have shown that the corrosion-free attachment of the CMC disk brake to the disk brake cup can effectively prevent corrosion on the disk brake, particularly "idle spots." In addition, the irritating sounds at 1500 to 6500 Hz produced by conventional brakes no longer occur when CMC disk brakes are used, due to the advantageous material properties of the ceramic-metal composite material. This is due to the high vibration damping properties of these materials. These reasons for premature disk brake replacement in conventional brakes are thus also eliminated.

The combination according to the present invention of a brake rotor made of ceramic-metal composite material, corrosion-optimized attachment of the disk brake cup to the disk brake, and suitable friction linings, permits the brake unit according to the present invention to achieve a service life, during which the brake unit can be operated in corrosion-free fashion, which is superior to that of previously known brake units. This is the case even if free carbon is present, for example, in the material of the disk brake. Operating costs, availability, and customer satisfaction are thereby considerably improved as compared to the presently known related art.

One advantageous embodiment of the present invention provides for the friction surface of the brake rotor to have a surface roughness Rz of approximately 2 to 15 μm. In combination with the typical hardness for composite materials of approximately 1600 to 2500 HV (per DIN 50133), this yields particularly high load capability and wear resistance for the brake unit according to the present invention. At least the friction surface of the brake rotor, if not the entire brake rotor or the entire disk brake, can be preferably made of an aluminum-ceramic composite material. For example, this material can be based on aluminum oxide, titanium dioxide, boron trioxide, and/or titanium boride with aluminum, for example as described in German Patent Application 197 06 925.8-45. The material can also be formed of a silicon-ceramic composite material, for example based on silicon carbide. A fiber-reinforced composite material that has, for example, carbon fibers and/or silicon carbide fibers as reinforcing fibers is particularly preferred, although other fibers based on carbon, nitrogen, silicon, or boron are also suitable.

Long fibers, for example in the form of fiber fabrics or fiber plies, are suitable as reinforcing fibers. Short fibers, for example isotropically oriented short fibers, as described in German Patent 197 11 829 C1, are particularly preferred, so that the friction surface or the disk brake has isotropic (i.e. homogeneous) properties in both the longitudinal and the transverse direction.

The composite material can have, for example, a silicon carbide ceramic or an aluminum oxide ceramic as the ceramic component. Other ceramics are, however, also suitable.

The friction surface of the brake rotor and the brake rotor itself are preferably configured integrally and are made of the same material, for example of a CMC material. It is particularly preferred to manufacture the entire disk brake integrally from a CMC material, which makes production particularly simple and economical.

An especially long service life is achieved by the fact that the at least one friction lining has a compressibility of at least approximately 1 μm per bar of pressure applied by the brake fluid. Suitable friction linings are those with an organic binder or inorganic binder that are subjected, in known fashion, to a special heat treatment in order to withstand the higher friction surface temperatures typical of CMC brakes. Also suitable as the friction lining are high-temperature-tempered sintered linings or linings made of high-temperature-treated ceramic material, preferably of silicon carbide ceramic or aluminum oxide ceramic. This adaptation of the friction linings also helps prevent thermal stress cracks in the friction surface of the brake rotors.

The disk brake cup is preferably attached in floating fashion to the disk brake, which ensures additional damping of vibrations in the range from 1500 Hz to 6500 Hz. The adaptation of the friction linings just described also contributes to this damping. The corrosion-inhibiting attachment of the disk brake cup to the disk brake is preferably carried out using a disk brake cup constituted from a noncorroding material, e.g. from V2A steel, anodized aluminum, or high-alloy forgeable steel, also known as Nirosta steel. In this context, anodized aluminum can simultaneously serves as a protective layer and friction layer for internally located drum brakes.

Instead or in addition to the stainless steel, the corrosion-inhibiting attachment can be formed by mounting elements constituted entirely or partially from a noncorroding material, preferably V2A steel.

The mounting elements can be constituted, for example, as axial disk retaining elements in the form of screws, rivets, pins, or the like. The disk brake cup preferably has a tubular mounting element that is inserted into corresponding receiving orifices provided in the disk brake, and receives the axial disk retaining elements.

The axial disk retaining elements can moreover have washers or the like made of a noncorroding material, such as V2A steel, anodized aluminum, high-alloy forgeable stainless steel, fiber-reinforced ceramic, or fiber-reinforced glass, which have an additional corrosion-inhibiting effect.

The receiving orifices can additionally be lined with heat-insulating sleeves, for example made of ceramic, fiber-reinforced ceramic, plastic, fiber-reinforced plastic, or fiber-reinforced glass, in order to prevent thermal transfer from the heat-affected brake rotors to the mounting elements or the disk brake cup.

BRIEF DESCRIPTION OF THE DRAWINGS

The accompanying drawing is included to provide a further understanding of the invention, is incorporated in and constitutes a part of this specification, illustrates an embodiment of the invention and, together with the description, serves to explain the objects, advantages, and principles of the invention.

The drawing shows a schematic partial cutaway depiction, not to scale, of an exemplary embodiment of a brake unit according to the invention.

DETAILED DESCRIPTION OF PREFERRED EMBODIMENTS OF THE INVENTION

Figure 1:
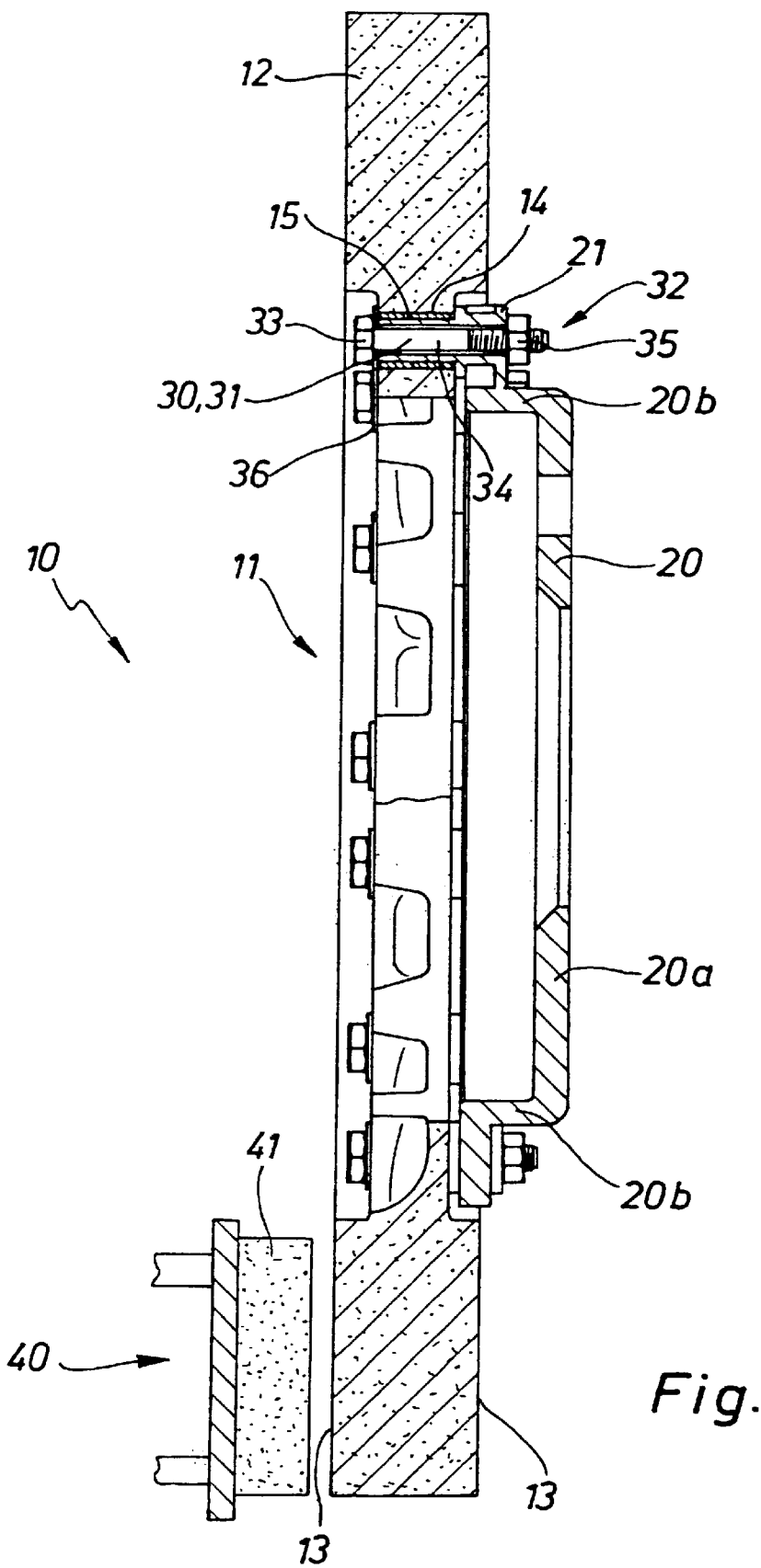

The drawing shows one embodiment of a brake unit 10 according to the present invention, made up of a disk brake 11 and brake pads 40 having friction linings 41. Disk brake 11 has a brake ring or brake rotor 12. The outer surfaces of brake rotor 12 serve as friction surfaces 13 for friction linings 40 of brake pads 41. At least friction surface 13, but preferably the entire brake unit 10, is made of a ceramic-metal composite material, in the exemplary embodiment having a composition with approximately 10 to 55 wt % silicon carbide, approximately 30 to 78 wt % carbon fibers or silicon carbide fibers that are preferably isotropically oriented short fibers, and approximately 0 to 25 wt % silicon. The hardness is in the range of, for example, from approximately 1600 to 2500 HV, per DIN 50133, and surface roughness Rx is approximately 2 to 15 μm.

Mounted on disk brake 11 is an adapter or disk brake cup 20, preferably attached in the "floating" fashion shown in the Figure. Disk brake cup 20 has a round, substantially flat base surface 20a as well as a circumferential edge 20b. Adjoining circumferential edge 20b at edge 20b are integral mounting segments 21, one of which is shown in cross section. Mounting segment 21 is preferably approximately tubular, and can be inserted into a corresponding receiving orifice 14 in brake unit 10. Receiving orifice 14 can be lined with a heat-insulation sleeve 15 that is made of a material having low thermal conductivity, for example a ceramic material such as aluminum oxide or silicon carbide.

A mounting element 30 is formed in the tubular mounting segment 21 which, in the exemplary embodiment, can be an axial disk retaining element 31, for example in the form of a rivet, screw, or pin. In the Figure this is shown as a screw 32, having a head 33 and a shaft 34, which is immobilized at its end remote from head 33 by a nut 35. A washer 36, which can also be made of a corrosion-inhibiting material, for example a ceramic material, fiber-reinforced glass, or fiber-reinforced glass ceramic, can additionally be provided between nut 35 and mounting segment 21.

Disk brake cup 20 or retaining element 31, or both, can be made of a noncorroding material, for example V2A steel, anodized aluminum, or high-alloy forgeable stainless steel.

Friction linings 41 of brake pads 40 can be made of organically or inorganically bound material that has been made temperature-resistant by heat treatment. Friction linings 41 can also be sintered linings that have been made temperature-resistant by high-temperature tempering, or ceramic linings that have also been made temperature-resistant by a high-temperature treatment. These linings 41 preferably have a coefficient of friction of approximately 0.3 to 0.5, preferably combined with a compressibility of approximately 1 μm per bar of brake fluid pressure.

The combination according to the present invention of the friction surface material, brake lining material, and corrosion-inhibiting attachment, makes it possible to achieve with the brake units described a service life of at least approximately eight to ten years, or mileages of at least approximately 200,000 to 300,000 km. The brake unit according to the present invention can be operated in corrosion-free fashion over its entire service life, even though free carbon is present, for example in the material of the disk brake.

The table below illustrates the results of test stand experiments using the brake unit just described.

| Simulated load | Measured mileage (km) |
|---|---|
| Collective block wear | 15,583 |
| AK standard | 3,100 |
| High-speed braking | 26,200 |
| Total | 44,883 |

These results were obtained with a measured disk wear of 0.19 mm and a permissible disk wear of 2.6 mm derived from the value for a vented front-wheel disk of conventional construction. This amount of wear would translate to a mileage of 44,883 ×(2.6/0.19)=615,000 km, before reaching the brake disc wear limits.

With a measured disk wear of 0.19 mm and a permissible disk wear of 2.0 mm derived from the new value for a vented front-wheel disk, the resulting maximum mileage is of 44,883 ×(2.0/0.19)=473,000 km. This is far greater than the mileage values that can be obtained using conventional brake units.

It will be apparent to those skilled in the art that various modifications and variations can be made in the structure and the methodology of the present invention, without departing from the spirit or scope of the invention. Thus, it is intended that the present invention cover the modifications and variations of this invention provided they come within the scope of the appended claims and their equivalents.

What is claimed is:

1. A brake unit having at least one disk brake, comprising:
    a brake rotor made of a ceramic-metal composite, having a friction surface with a hardness of between about 1600 and 2500 HV;
    at least one brake pad having a friction lining adapted to contact the friction surface of the brake rotor, the friction lining having a coefficient of friction of between about 0.3 and 0.5; and
    a disk brake cup mounted on the brake rotor by at least one mounting element, the disk brake cup being formed of a noncorroding material and the mounting elements being formed at least in part from a noncorroding material, thus forming a corrosion-inhibiting attachment of the brake rotor.

2. The brake unit as defined in claim 1, wherein the friction surface of the brake rotor is made of a fiber-reinforced composite material.

3. The brake unit as defined in claim 2, wherein the fiber-reinforced composite material comprises at least one of carbon fibers and silicon carbide fibers as reinforcing fibers.

4. The brake unit as defined in claim 2, wherein the composite material has long fiber fabrics or fiber plies as reinforcing fibers.

5. The brake unit as defined in claim 2, wherein the composite material has short isotropically oriented fibers as reinforcing fibers.

6. The brake unit as defined in claim 2, wherein the composite material comprises a ceramic component formed of one of a silicon carbide ceramic and an aluminum oxide ceramic.

7. The brake unit as defined in claim 1, wherein the mounting elements are disk retaining elements formed by one of screws, rivets and pins.

8. The brake unit as defined in claim 7, further comprising a tubular mounting element formed on the disk brake cup, adapted for insertion into corresponding receiving orifices formed in the brake rotor, the tubular mounting element cooperating with the disk retaining elements to secure the disk brake cup to the disk rotor.

9. The brake unit as defined in claim 8, wherein the disk retaining elements comprise washers made of a noncorroding material selected from one of V2A steel, anodized aluminum, high-alloy forged stainless steel, fiber-reinforced ceramic, and fiber-reinforced glass.

10. The brake unit as defined in claim 8, further comprising heat-insulating sleeves lining the receiving orifices, said insulating sleeves being made from one of ceramic, fiber-reinforced ceramic, plastic, fiber-reinforced plastic, and fiber-reinforced glass.

11. The brake unit as defined in claim 1, wherein the friction surface of the brake rotor has a surface roughness Rz of between about 2 and 15 μm.

12. The brake unit as defined in claim 1, wherein the friction surface of the brake rotor is made of one of an aluminum-ceramic composite material and a silicon-ceramic composite material.

13. The brake unit as defined in claim 1, wherein the friction surface of the brake disk rotor and the brake rotor are integrally made of the same material.

14. The brake unit as defined in claim 1, wherein the brake rotor, the friction surface and the disk brake cup are integrally made of the same material.

15. The brake unit as defined in claim 1, wherein the friction lining has a compressibility of at least about 1 $\mu$m/bar.

16. The brake unit as defined in claim 1, wherein the friction lining is a heat-treated friction lining with an organic binder.

17. The brake unit as defined in claim 1, wherein the friction lining is a heat-treated friction lining with an inorganic binder.

18. The brake unit as defined in claim 1, wherein the friction lining is a high-temperature-tempered sintered lining.

19. The brake unit as defined in claim 1, wherein the friction lining is made of high-temperature-treated ceramic material.

20. The brake unit as defined in claim 19, wherein the friction lining is made of silicon carbide ceramic.

21. The brake unit as defined in claim 19, wherein the friction lining is made of aluminum oxide ceramic.

22. The brake unit as defined in claim 1, wherein the disk brake cup is made of one of V2A steel, anodized aluminum, and high-alloy forged stainless steel.

23. The brake unit as defined in claim 1, wherein the mounting elements are made at least partially of V2A steel.

* * * * *